(12) United States Patent
Li et al.

(10) Patent No.: US 10,047,279 B2
(45) Date of Patent: Aug. 14, 2018

(54) HIGH TEMPERATURE VISCOELASTIC SURFACTANT (VES) FLUIDS COMPRISING POLYMERIC VISCOSITY MODIFIERS

(71) Applicant: Saudi Arabian Oil Company, Dhahran (SA)

(72) Inventors: Leiming Li, Sugar Land, TX (US); Feng Liang, Cypress, TX (US); Sehmus Ozden, Houston, TX (US); Ghaithan A. Al-Muntasheri, Houston, TX (US); B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/581,408

(22) Filed: Apr. 28, 2017

(65) Prior Publication Data

US 2017/0327733 A1 Nov. 16, 2017

Related U.S. Application Data

(60) Provisional application No. 62/335,363, filed on May 12, 2016.

(51) Int. Cl.
*C09K 8/588* (2006.01)
*C09K 8/68* (2006.01)
(Continued)

(52) U.S. Cl.
CPC ............... *C09K 8/68* (2013.01); *C09K 8/035* (2013.01); *C09K 8/602* (2013.01); *C09K 8/74* (2013.01); *C09K 2208/30* (2013.01)

(58) Field of Classification Search
CPC .......... C09K 6/035; C09K 6/68; C09K 6/602; C09K 6/74; C09K 2208/30
(Continued)

(56) References Cited

U.S. PATENT DOCUMENTS 3,401,094 A 9/1968 Lindsay, Jr.
4,930,575 A * 6/1990 Falk ........................ C09K 8/512
166/285

(Continued)

FOREIGN PATENT DOCUMENTS

CN 105112041 A 12/2015
EP 1634938 A1 3/2006
(Continued)

OTHER PUBLICATIONS

Hull, et al. "Recent Advances in Viscoelastic Surfactants for Improved Production from Hydrocarbon Reservoirs" Society of Petroleum Engineers, SPE International Symposium on Oil Field Chemistry held Apr. 13-15, 2017.
(Continued)

*Primary Examiner* — Aiqun Li
(74) *Attorney, Agent, or Firm* — Dinsmore & Shohl LLP

(57) ABSTRACT

In accordance with one or more embodiments, this disclosure describes a viscoelastic surfactant fluid for a subterranean formation comprising: brine solution; at least one polyacrylamide viscosity modifier with a weight averaged molecular weight (Mw) from 250,000 g/mol to 40,000,000 g/mol; and a viscoelastic surfactant according to formula (I):

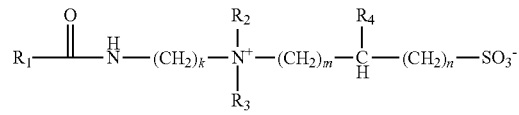

where $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms; $R_4$ is (Continued)

selected from H, hydroxyl, alkyl or hydroxyalkyl groups of from 1 to 4 carbon atoms; k is an integer of from 2-20; m is an integer of from 1-20; and n is an integer of from 0-20.

24 Claims, 5 Drawing Sheets

(51) Int. Cl.
*C09K 8/60* (2006.01)
*C09K 8/035* (2006.01)
*C09K 8/74* (2006.01)

(58) Field of Classification Search
USPC .......................................................... 507/225
See application file for complete search history.

(56) References Cited

U.S. PATENT DOCUMENTS

| | | | |
|---|---|---|---|
| 7,081,439 B2 | 7/2006 | Sullivan et al. | |
| 7,244,694 B2 | 7/2007 | Fu et al. | |
| 7,380,606 B2 | 7/2008 | Pursley et al. | |
| 7,392,848 B1 | 7/2008 | Bader | |
| 7,461,694 B2 | 12/2008 | Dahanayake et al. | |
| 7,703,531 B2 | 4/2010 | Huang et al. | |
| 9,080,043 B2 | 7/2015 | Yuan-Huffman et al. | |
| 9,341,052 B2 | 5/2016 | Gadberry et al. | |
| 2008/0153720 A1 | 6/2008 | Huang et al. | |
| 2009/0111716 A1* | 4/2009 | Hough | C09K 8/584 507/214 |
| 2010/0022418 A1 | 1/2010 | Milne et al. | |
| 2014/0076572 A1 | 3/2014 | Gadberry et al. | |
| 2015/0315457 A1 | 11/2015 | Ali et al. | |
| 2015/0368547 A1 | 12/2015 | Lesko et al. | |
| 2016/0017210 A1 | 7/2016 | Li et al. | |
| 2016/0355723 A1 | 12/2016 | Yadav et al. | |
| 2016/0356107 A1 | 12/2016 | Sarmah et al. | |

FOREIGN PATENT DOCUMENTS

| | | |
|---|---|---|
| WO | 03056130 A1 | 7/2003 |
| WO | 2008036812 A2 | 3/2008 |
| WO | 2008100436 A1 | 8/2008 |
| WO | 2008151331 A1 | 12/2008 |
| WO | 2012160008 A1 | 11/2012 |
| WO | 2014140055 A1 | 9/2014 |
| WO | 2016083318 A1 | 6/2016 |
| WO | 2016083322 A1 | 6/2016 |
| WO | 2016196812 A1 | 12/2016 |

OTHER PUBLICATIONS

International Search Report and Written Opinion pertaining to PCT/US2017/031201 dated Jun. 20, 2017.
International Search Report and Written Opinion pertaining to PCT/US2017/031195 dated Jul. 12, 2017.

* cited by examiner

HIGH TEMPERATURE VISCOELASTIC SURFACTANT (VES) FLUIDS COMPRISING POLYMERIC VISCOSITY MODIFIERS

CROSS-REFERENCE TO RELATED APPLICATIONS

This application claims priority to U.S. Provisional Patent Application Ser. No. 62/335,363 filed May 12, 2016, which is incorporated by reference herein in its entirety.

TECHNICAL FIELD

Embodiments of the present disclosure generally relate to fluid fracturing of subterranean formations in hydrocarbon reservoirs to enhance the flow of hydrocarbons to a wellbore in the formation, and more specifically relate to high temperature viscoelastic surfactant ("VES") fracturing fluids.

BACKGROUND

Hydraulic fracturing is a well stimulation technique that involves injecting a fracturing fluid into subterranean formations at rates and pressures sufficient to rupture the subterranean formation to produce or widen compressed flow conduits, that is fissures, cracks, natural fractures, faults, lineaments and bedding planes. Viscoelastic surfactant (VES) fluids are often used in oilfield applications, such as hydraulic fracturing. Specifically, the viscoelastic fluids exhibit both elastic behavior and viscous behavior due to the micelles formed under different conditions. When the viscoelastic fluid is subjected to shear stress, for example, by a pump, the viscoelastic fluid is shear thinned to produce a low viscosity fluid, which is easier to pump. When the shear stress is stopped, the viscoelastic fluid returns to a higher viscosity condition. Because the fracturing fluid contains a proppant that keeps an induced hydraulic fracture open after the pressure is released, a higher viscosity enables the VES fluid to suspend and transport the proppant into the fracture.

The viscoelastic fluid includes wormlike micelles that become entangled to form a 3-dimensional (3D) viscoelastic gel, in which mobility of solution molecules, for example, water is limited. Due to the advantages, such as low subterranean formation damage, good proppant suspending and carrying ability, good compatibility with brine and produced water, the viscoelastic fluids are widely used in oilfield operations including fracturing, completion, acidizing, sand control, or water shut-off.

However, current viscoelastic systems have a temperature limit of approximately 250 degree Fahrenheit (° F.) beyond which the fluid viscosity is unsuitable for fracturing application.

SUMMARY

Ongoing needs exist to obtain high viscosities at higher temperatures, while using less high temperature viscoelastic surfactant (HT VES). This disclosure provides a formulation which achieves a higher viscosity while reducing the amount of HT VES or keeping the same amount of HT VES needed to retain compatibility with the brine and proppant and maintaining a high viscosity at temperatures greater than 250° F.

Embodiments of the present disclosure are directed to hydraulic fracturing treatments of underground oil and gas bearing formations. The fracturing fluids must be stable at high temperature and stable at high pump rates and shear rates. The embodiments found in this disclosure are designed to effectively lower the amount HT VES needed at temperatures from 250 to 350° F., while keeping the similar viscosity through the use of selected polymers including acrylamide-based polymers and copolymers. The viscoelastic fluids are enhanced with polyacrylamides, which results in higher fluid viscosity. Surprisingly, the selected polyacrylamides may have attached to multiple HT VES micelles in the fluid, thus strengthening the 3D network of the HT VES micelles, which, as a result, increases viscosity beyond expected values. There is also an increase in dispersion for the polyacrylamides in a powder formulation due to VES fluid viscosity.

In accordance with one or more embodiments, this disclosure describes a viscoelastic fluid for a subterranean formation comprising: brine solution; at least one acrylamide-based polymer or copolymer having a hydrolysis level of less than 5 mole percent (mol %) and a weight averaged molecular weight (Mw) from 250,000 grams per mole (g/mol) to 40,000,000 g/mol; and a viscoelastic surfactant according to formula (I):

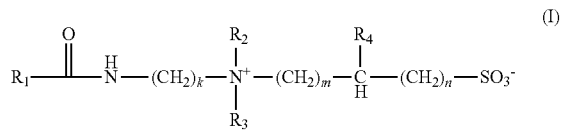

In formula (I), $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms; $R_4$ is selected from H, hydroxyl, alkyl or hydroxyalkyl groups of from 1 to 4 carbon atoms; k is an integer of from 2-20; m is an integer of from 1-20; and n is an integer of from 0-20.

In accordance with one or more embodiments, this disclosure describes a method of treating a subterranean formation with a viscoelastic fluid comprising adding viscoelastic surfactant and a formulation comprising a polyacrylamide viscosity modifier to a brine solution to produce the viscoelastic fluid, and introducing the viscoelastic fluid into the subterranean formation, in which the viscoelastic fluid is subjected to temperatures greater than 250° F. In this embodiment, the polyacrylamide viscosity modifier has a hydrolysis level of less than 5 mol % and a weight averaged molecular weight (Mw) from 250,000 g/mol to 40,000,000 g/mol, and the viscoelastic surfactant according to formula (I):

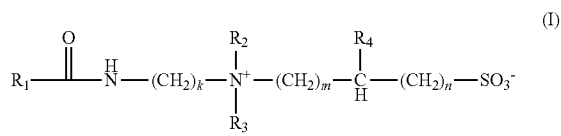

In formula (I), $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms; k is an integer of from 2 to 20; m is an integer of from 1 to 20; and n is an integer of from 0 to 20.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

FIG. 1 is a graph of viscosity in centipoise (cP) at 100 per second (/s) shear rate as a function of temperature. The samples include the baseline, baseline fluid with 1% of a nonionic polyacrylamide polymer (as a solid line), and a calculated curve from the simple addition of the baseline curve and a 1% nonionic polyacrylamide curve (as a dotted line).

FIG. 2 is a graph of viscosity in cP at 100/s shear rate as a function of temperature. The samples include the baseline, the baseline magnified 20 times (++++), the baseline fluid with approximately 10% of a nonionic polyacrylamide polymer (dark solid line), and a fluid with approximately 10% of the nonionic polyacrylamide polymer without HT VES (light grey line).

FIG. 3 is a graph of the viscosity in cP at 100/s shear rate as a function of temperature. The samples include the baseline, and the baseline fluid with approximately 0.5% of a "SP 292" polymer (solid line), which is an anionic-polyacrylamide-based-terpolymer.

FIG. 4 is a graph of the viscosity in cP at 100/s shear rate as a function of temperature. The samples include the baseline and the baseline fluid with approximately 0.5% of a "FP 9515" polymer (solid line), which is an anionic-polyacrylamide-based-terpolymer.

FIG. 5 is a graph of the viscosity in cP at 100/s shear rate as a function of temperature. The samples include the baseline and the baseline fluid with approximately 0.5% of a polyvinyl alcohol (PVA) polymer (solid line).

Figure 1:
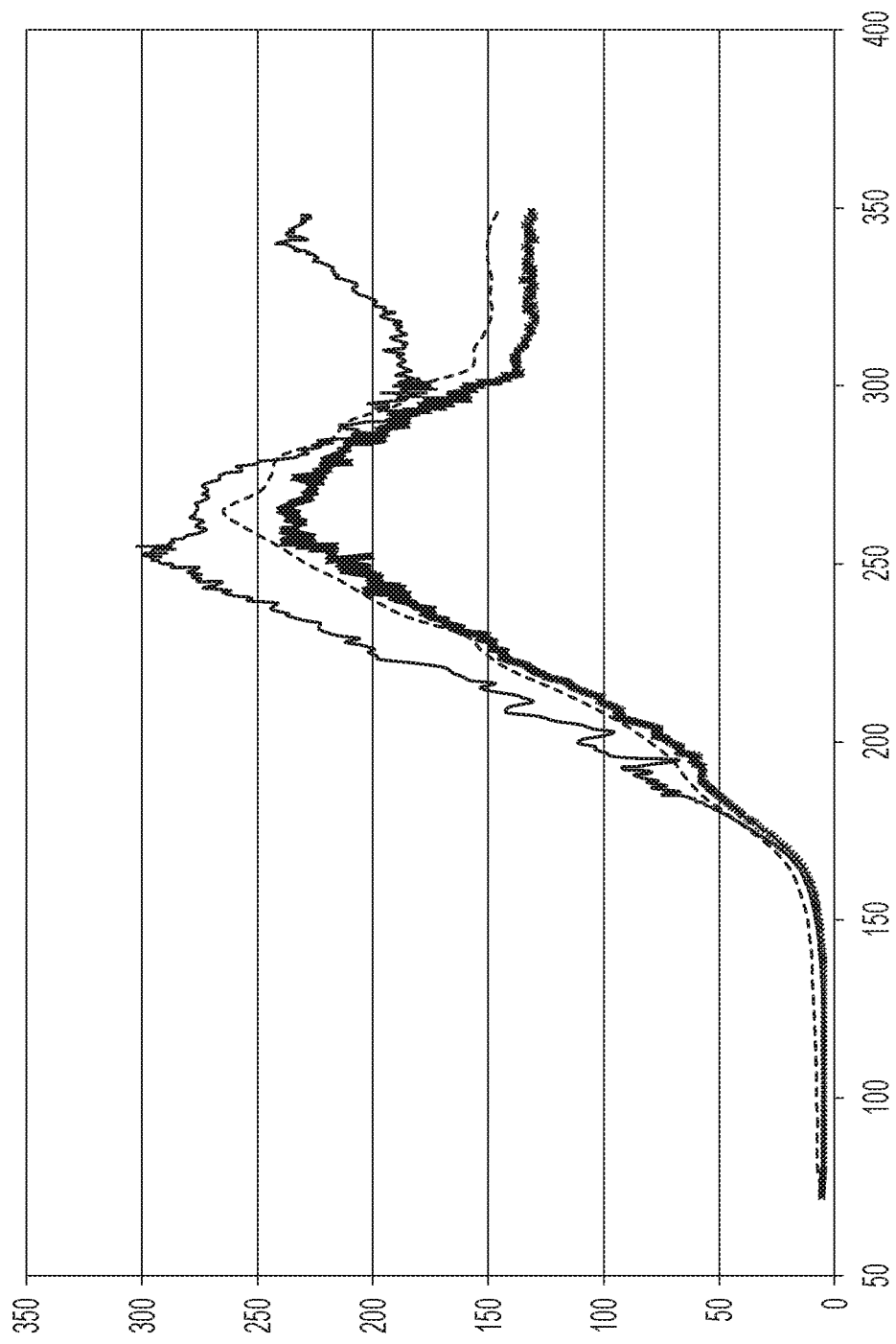
FIGS. 1 to 5 depict a baseline curve of a viscoelastic fluid represented by the thickest line (due to backslashes). The viscoelastic fluid, "baseline fluid," as denoted in FIGS. 1 to 5, comprises 5% HT VES and brine.

The embodiments set forth in the drawings are illustrative in nature and not intended to be limiting to the claims. Moreover, individual features of the drawings will be more fully apparent and understood in view of the detailed description.

DETAILED DESCRIPTION

Specific embodiments of the present application will now be described. The disclosure may, however, be embodied in different forms and should not be construed as limited to the embodiments set forth within this disclosure. Rather, these embodiments are provided so that this disclosure will be thorough and complete, and will fully convey the scope of the disclosure to those skilled in the art.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

As used in this disclosure, "approximately" is used to address the fluctuation and slight imprecision often associated with measurements, such as measurements associated with reaction conditions. For example, when approximately refers to a percentage, then "approximately" includes plus or minus 1%. When approximately refers to a temperature or temperature range, then "approximately" includes plus or minus 10 degrees. The disclosure of any ranges in the specification and claims are to be understood as including the range itself and also anything subsumed within the range, as well as endpoints. Unless otherwise indicated, the numerical properties set forth in the specification and claims are approximations that may vary depending on the desired properties sought to be obtained in embodiments of the present disclosure. Notwithstanding that numerical ranges and parameters setting forth the broad scope of this disclosure are approximations, the numerical values set forth in the specific examples are reported as precisely as possible. Any numerical values, however, inherently contain certain errors necessarily resulting from error found in their respective measurements.

As used in this disclosure, the term "water" includes deionized water, distilled water, brackish water, brine, fresh water, spring water, tap water, mineral water or water substantially free of chemical impurities.

As used in this disclosure, the term "polymer" refers to homopolymers, copolymers, interpolymers, and terpolymers. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer.

The term "polyacrylamide" includes polyacrylamide homopolymers or copolymers with near zero amounts of acrylate groups; a polyacrylamide homopolymer or copolymer with a mixture of acrylate groups and acrylamide groups formed by hydrolysis; copolymers comprising acrylamide or acrylic acid, and optionally other monomers; and acrylamide-based polymers.

Embodiments of the present disclosure are directed to oilfield operations such as hydraulic fracturing treatments of underground oil and gas bearing formations, and generally relates to viscoelastic fluids and to methods of using those fluids. This disclosure describes a viscoelastic fluid that maintains viscosity even at temperature of 250° F. or greater. The combination of viscoelastic surfactant, polyacrylamide viscosity modifier and brine increases the viscosity, without increasing the loading of viscoelastic surfactant. The viscoelastic fluid can be used to stimulate or modify the permeability of underground formations, in drilling fluids, completion fluids, workover fluids, acidizing fluids, gravel packing, and fracturing.

The viscosity of a viscoelastic fluid may vary with the stress or rate of strain or shear rate applied. In the case of shear deformations, it is very common that the viscosity of the fluid drops with increasing shear rate or shear stress. This behavior is referred to as "shear thinning." Surfactants can cause viscoelasticity in fluids and may manifest shear thinning behavior. For example, when such a fluid is passed through a pump or is in the vicinity of a rotating drill bit, the fluid is in a higher shear rate environment and the viscosity is decreased, resulting in low friction pressures and pumping energy savings. When the shear stress is removed, the fluid returns to a higher viscosity condition.

At elevated temperatures, the average kinetic energy of the molecules in the fluid increases, causing more disruptions to the VES micelle structures and the attractions among the micelles. This can lower the overall viscosity of the fluid. Generally, an increase in temperature correlates to a logarithmic decrease in the time required to impart equal strain under a constant stress. Therefore, it takes less work to stretch a viscoelastic material an equal distance at a higher temperature than it does at a lower temperature. The addition of polymers like nonionic polyacrylamide to the fluid may improve the fluid viscosity at elevated temperatures. One polyacrylamide polymer chain may connect to multiple VES micelles, thus enhancing the stability of the 3D network of the VES micelles.

In one or more embodiments, a viscoelastic fluid for a subterranean formation includes a viscoelastic surfactant according to formula (I), a brine solution, and at least one polyacrylamide viscosity modifier.

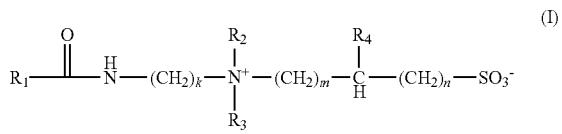

(I)

In the formula (I), $R_1$ is a saturated or unsaturated hydrocarbon group of from 17 to 29 carbon atoms. In other embodiments, $R_1$ is a saturated or unsaturated, hydrocarbon group of 18 to 21 carbon atoms. $R_1$ can also be a fatty aliphatic derived from natural fats or oils having an iodine value of from 1 to 140. In some embodiments, the iodine value, which determines the degree of unsaturation, can range from 30 to 90 or from 40 to 70. $R_1$ may be restricted to a single chain length or may be of mixed chain length such as groups derived from natural fats and oils or petroleum stocks. The natural fats and oils or petroleum stocks may comprise tallow alkyl, hardened tallow alkyl, rapeseed alkyl, hardened rapeseed alkyl, tall oil alkyl, hardened tall oil alkyl, coco alkyl, oleyl, erucyl, soya alkyl, or a combination thereof.

In some embodiments of formula (I), $R_2$ and $R_3$ are each independently selected from a straight chain or branched alkyl or hydroxyalkyl group of from 1 to 6 carbon atoms, in other embodiments from 1 to 4 carbon atoms, and in another embodiment from 1 to 3 carbon atoms. $R_4$ is selected from H, hydroxyl, alkyl or hydroxyalkyl groups of from 1 to 4 carbon atoms, and can be selected from methyl, ethyl, hydroxyethyl, hydroxyl or methyl, but is not limited to this list of groups.

In one or more embodiments of formula (I), subscript k is an integer of from 2 to 20, in other embodiments, from 2 to 12, and in another embodiment from 2 to 4. The m is an integer of from 1-20, in other embodiments from 1 to 12, in another embodiment from 1 to 6, and in some embodiments, m can also be an integer from 1 to 3. Finally, n is an integer from 0 to 20, from 0 to 12, or from 0 to 6. In some embodiments, n is an integer from 0 to 1.

The viscoelastic surfactant according to embodiments of this disclosure is able to form viscoelastic fluids at lower concentrations than other surfactants. This specific rheological behavior is mainly due to the types of surfactant aggregates that are present in the fluids. In low viscosity fluids, such as water, the surfactant molecules aggregate in spherical micelles. Whereas in viscoelastic fluids, long micelles, which can be described as worm-like, thread-like or rod-like micelles, are present and entangled. These long flexible wormlike micelles can form in the presence of salt, and by entangling, they form a transient network and impart viscoelastic properties to the solution. These micelles can function as thickening and rheology control agents in aqueous systems. Wormlike micelles are in thermal equilibrium with their monomers. Thus, micellar self-assembly (and hence, their length and flexibility) responds to changes in surfactant and salt concentration, as well as changes in temperature.

In some embodiments, the viscoelastic surfactant may be a high temperature viscoelastic surfactant (HT VES). In one or more embodiments, the viscoelastic surfactant is erucamidopropyl hydroxypropylsultaine, commercially known as Armovis EHS® provided by Akzo Nobel.

The viscoelastic fluid in this disclosure incorporates a low percent by weight of the viscoelastic surfactant. The amount of viscoelastic surfactant in the viscoelastic fluid can vary. In some embodiments, the viscoelastic fluid contains 0.5% by weight to 10% by weight of viscoelastic surfactant. Whereas in another embodiment, the viscoelastic fluid comprises 2% by weight to 8% by weight of viscoelastic surfactant. Other embodiments of the viscoelastic fluid may include a viscoelastic fluid having 3% by weight to 5% by weight of viscoelastic surfactant.

The addition of polyacrylamide viscoelastic modifiers into the viscoelastic fluids has increased the viscosity and lowered the amount of viscoelastic surfactant needed. The polyacrylamide viscoelastic modifiers, as referred to in this disclosure, include nonionic polyacrylamides, acrylamide copolymers, polyacrylamide-based terpolymers, polyacrylamide-based tetra-polymers, modified polyacrylamides, combinations of the aforementioned polymers, or an acrylamide-based polymer that has at least one functional group chosen from carboxylate, sulfate, sulfonate, phosphate or phosphonate. The acrylamide-based polymer optionally has one or more functional groups selected from the group consisting of sulfate, sulfonate, phosphate or phosphonate.

In one or more embodiments of this disclosure, the polyacrylamide viscosity modifier has a weight averaged molecular weight (Mw) from 250,000 g/mol to 40,000,000 g/mol, and in another embodiment, the polyacrylamide viscosity modifier has an Mw from 2,000,000 g/mol to 8,000,000 g/mol.

In some embodiments, the polyacrylamide viscosity modifier has a hydrolysis level of less than 5 mole percent (mol %). In other embodiments, the polyacrylamide viscosity modifier has a hydrolysis level of less than 1 mol %. In other embodiments, the polyacrylamide viscosity modifier has a hydrolysis level of less than 0.1 mol %, and in other embodiments the hydrolysis level is less than 0.001 mol %. The present viscoelastic fluids achieve suitable viscosity enhancement while using polyacrylamides at these minimal hydrolysis levels.

In some embodiments, additional surfactants are added into the viscoelastic fluid. Adding an additional surfactant may enhance the viscosity or effect the micelle formation at varying temperatures, pressures, or other changes in conditions. A non-limiting list of possible surfactants is cationic surfactant, anionic surfactant, non-ionic surfactant, amphoteric surfactant, zwitterionic surfactant or a combination thereof.

Salts ionize when in solution, and the counterions compatible with the surfactant can penetrate into the hydrophobic interior of the micelles, which promotes self-assembly. Different concentrations of brine, or salt solutions, affect the micelle assembly differently. Though viscoelastic surfactants can form micellar networks in lower concentrations compared to other surfactants, the viscosity modifiers, such as polyacrylamides, associate with surfactant micelles in viscoelastic surfactant solutions to better form networks that suspend or prevent the proppant from settling. If the proppant settles too quickly, it may accumulate at the bottom part of the fracture, clogging the fracture, and decreasing productivity. A formulation comprising viscoelastic surfactants and polyacrylamide viscosity modifiers may be better able to disperse and combine with the micelles, and as a result, the increase in viscosity is beyond expected values.

As mentioned in the preceding paragraphs, different salts and salt concentrations can affect the micelle formation. The brine solution in the viscoelastic fluid comprises one or more metal halides. In some embodiments, the metal halides may comprise alkali or alkaline earth metal halides. A non-limiting list of metal halides include: calcium chloride, calcium bromide, zinc bromide, or combinations thereof. Sequence of addition may vary, for example before the salt in the brine is added to solution, it may be combined with the polyacrylamide or viscoelastic surfactant to form a formulation, and when added to the solution or solvent, the formulation rapidly disperses.

In some embodiments, the viscoelastic fluid comprises approximately 1% by weight to 50% by weight salt. In another embodiment, the viscoelastic fluid comprises 10% by weight to 40% by weight of salt, and other embodiments comprise 15% by weight to 35% by weight of salt. Usually, the fluid contains about 1% to 6 wt % VES, 1 to 50 wt % salt, and the remaining percentage being primarily water.

Several solvents or combination of solvents can increase the performance of the viscoelastic surfactant. The solvent may comprise water, alcohol, or combinations thereof. The alcohol comprises alkyloxy, diol, triol, or a combination thereof. Examples of alkyloxy solvents include, but are not limited to methanol, ethanol, propanol, and butanol. Glycol molecules are dihydric alcohols or diols, and a non-limiting list of diol solvents includes: ethylene glycol, butylene glycol, diethylene glycol, glycerin, propylene glycol, tetramethylene glycol, tetramethylethylene glycol, trimethylene glycol, and the like.

Additional additives may be incorporated into the viscoelastic fluid to increase micelle formation, increase viscosity, or to enhance gel-strength, which is the force necessary to break the gel. Viscoelastic fluids in this disclosure may further contain one or more additives such as surfactants, salts potassium chloride, anti-foam agents, scale inhibitors, corrosion inhibitors, fluid-loss additives, breaker, and bactericides. The purpose of a breaker is to "break" or diminish the viscosity of the fracturing fluid so that this fluid is more easily recovered from the fracture during clean-up. In some embodiments, the viscoelastic fluids containing polyacrylamides may also include breaker material. The breaker material comprises encapsulated breaker. Additional additives may include, but are not limited to polyelectrolytes, such as polycations and polyanions, zwitterionic polymers, such as zwitterionic acrylamide-based polymers and copolymers and other surfactants.

Also optionally, a viscoelastic fluid, as described in this disclosure, may further comprise additives previously mentioned and materials designed to limit proppant flowback after the fracturing operation is complete by forming a porous pack in the fracture zone. Such materials, called "proppant flowback inhibitors," can be any known in the art, such as those available from Schlumberger under the name PROPNET®.

One embodiment described in this disclosure is a method of treating a subterranean formation penetrated by a wellbore with a viscoelastic fluid comprising: adding viscoelastic surfactant and a formulation comprising polyacrylamide viscosity modifier to a brine solution to produce the viscoelastic fluid. Then the viscoelastic fluid is introduced into the subterranean formation through the wellbore, where the treatment fluid is subjected to temperatures greater than 250° F. In one or more embodiments, the treatment fluid is subjected to temperatures greater than 275° F., and in another method treatment fluid is subjected to temperatures greater than 300° F.

EXAMPLES

Example 1

In the first sample, the baseline viscoelastic fluid was prepared by adding 5% by weight HT VES (Armovis® EHS) into a 30% by weight $CaCl_2$ brine. More specifically, 40.7 milliliter (mL) tap water, 26.8 gram (g) $CaCl_2.2H_2O$, and 2.6 mL HT VES were mixed together to form the baseline fluid. The viscosity of the baseline fluid was measured from approximately 70° F. to 350° F. at a shear rate of 100 per second ($s^{-1}$) with a Fann50-type viscometer, and plotted in FIG. 1 denoted by the thickest line (due to backslashes). In the second sample, a nonionic polyacrylamide (by Sigma-Aldrich, #92560-50G, in powder form) was mixed into the HT VES baseline fluid at a loading of 1% by weight. The viscosity was similarly measured from approximately 70° F. to 350° F., and plotted in FIG. 1 and denoted by a black line. On averaged between approximately 250° F. and approximately 350° F., the viscosity was enhanced by approximately 34% with the addition of 1% the nonionic polyacrylamide. The viscosity of the baseline VES in the first test and the viscosity of the nonionic polyacrylamide (1% by weight) were mathematically added (simple addition) and plotted in FIG. 1, as shown by the dotted line.

In FIG. 1, the calculated curve (dotted line plot) showed a smaller viscosity when compared to the viscosity of the experimental sample containing the HT VES and the polyacrylamide, for temperatures greater than 300° F. Since the experimental results showed a greater increase in viscosity than the theoretical or calculated result, a synergetic effect was attributed to combination of the HT VES and the nonionic polyacrylamide at high temperatures.

Example 2

In the first sample, the baseline viscoelastic fluid was prepared by adding 5% by weight HT VES into a 30% by weight $CaCl_2$ brine. More specifically, 40.7 ml tap water, 26.8 g $CaCl_2.2H_2O$, and 2.6 ml HT VES was mixed together to form the baseline fluid. The viscosity of the fluid was measured from approximately 70° F. to 350° F. at a shear rate of 100 $s^{-1}$ with a Fann50-type viscometer, and plotted in FIG. 2. For the baseline curve to be more visible in FIG. 2, the viscosity values were magnified by 20 times, and plotted (+++). In the second sample, a nonionic polyacrylamide (by Sigma-Aldrich, #92560-50G, in powder form) was mixed into the HT VES baseline fluid at a loading of approximately 10% by weight. The viscosity was similarly measured from approximately 70° F. to 350° F., and plotted as a dark solid line. The third sample was a control sample and was prepared similar to the fluid in the second test except that no HT VES was added, and that the HT VES was replaced with the same volume of tap water. The viscosity was similarly measured from approximately 70° F. to 350° F., and plotted as a grey line in FIG. 2.

Figure 2:
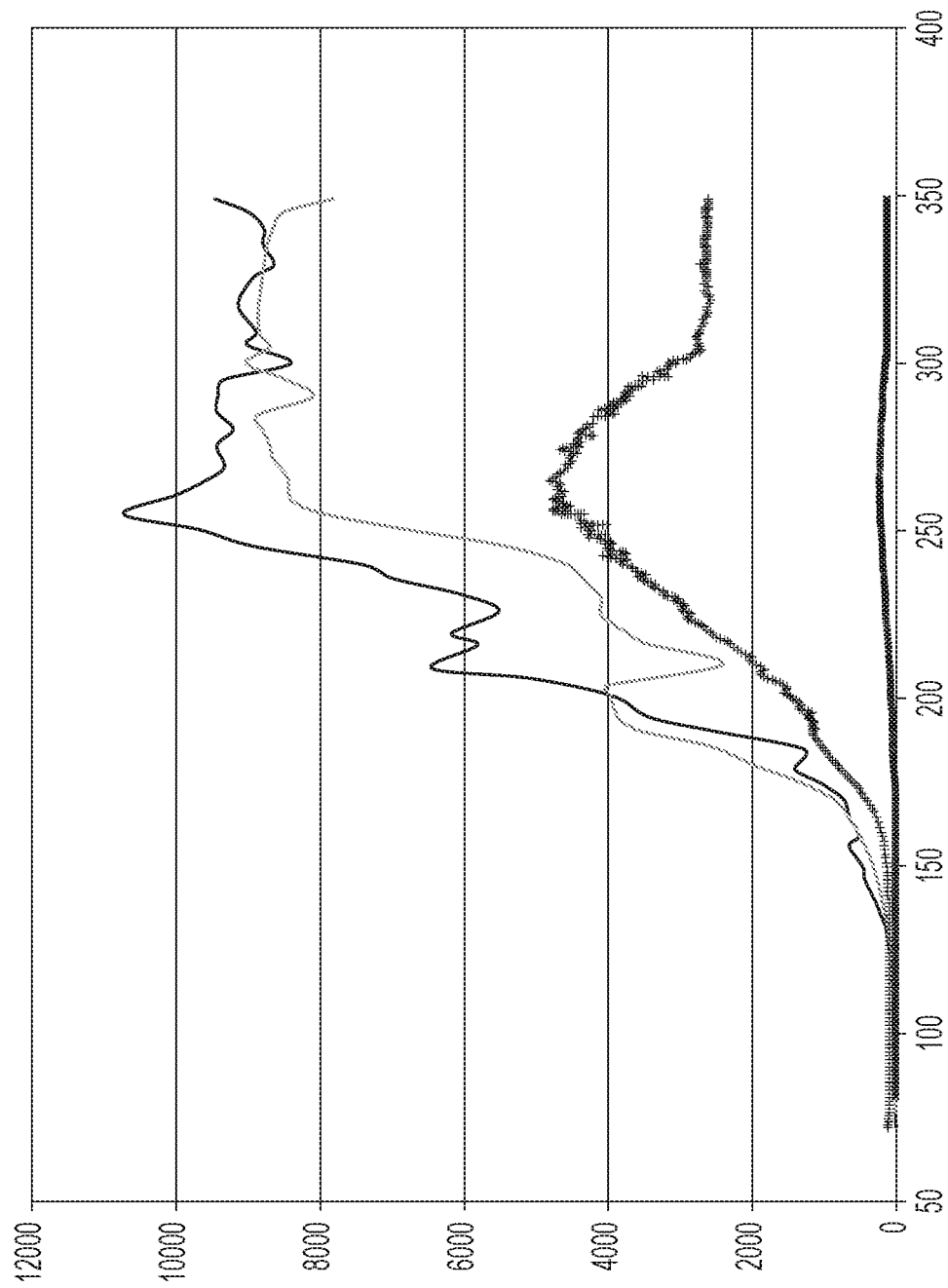

In FIG. 2, the baseline curve had a trivial viscosity, meaning the increase in viscosity was minimal or insignificant in comparison to the other viscoelastic fluids. However, the second sample containing the polyacrylamide and the HT VES had a viscosity that was significantly enhanced when compared to the curves representing the viscoelastic fluids with only 10% polyacrylamide or with only the HT VES at approximately 200-350° F. The significant increase in viscosity was attributed to a synergistic effect due to the combination of polyacrylamide and HT VES.

Example 3

Figure 3:
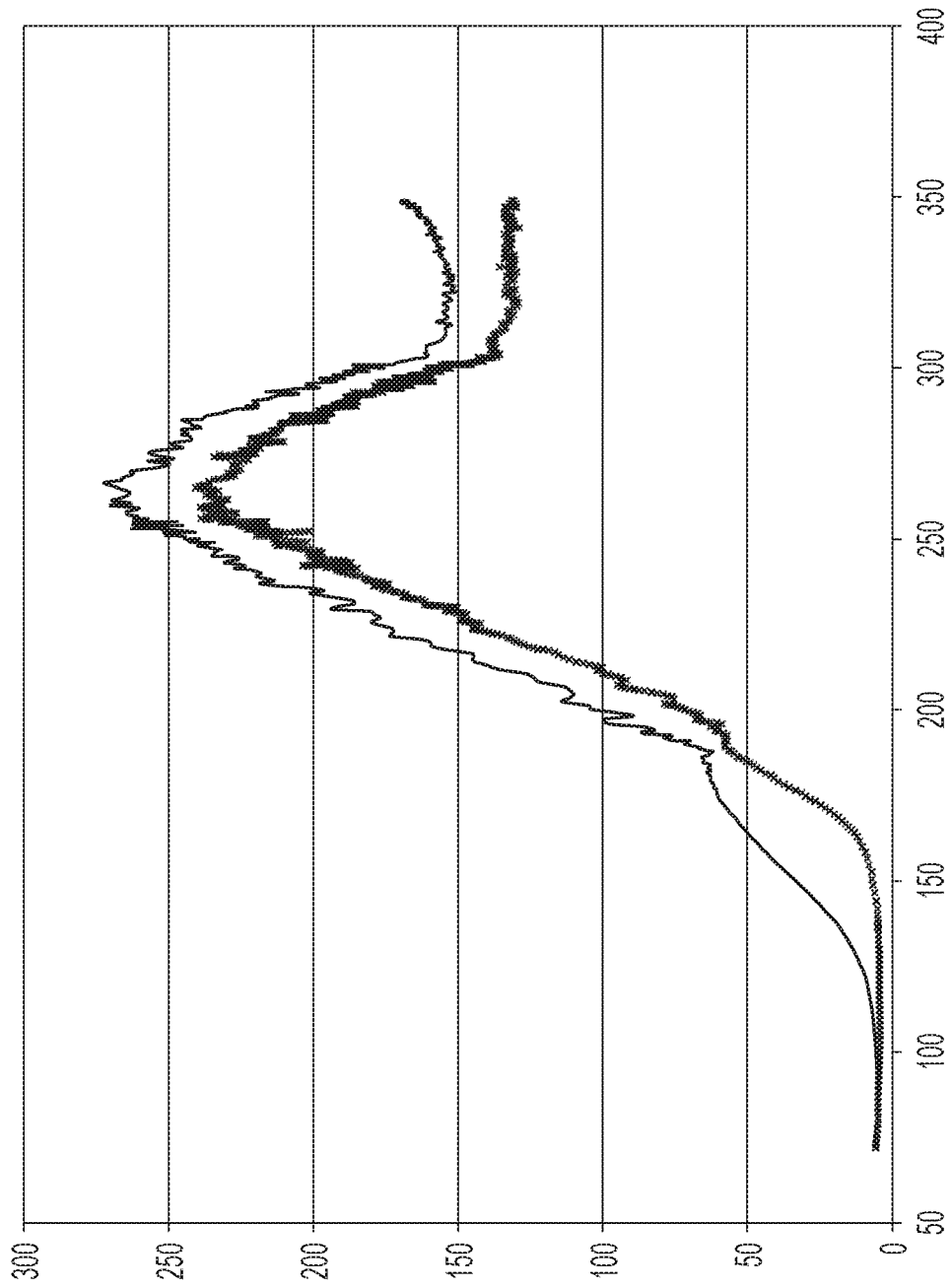

In this example, the baseline viscoelastic fluid was prepared by adding 5% by weight HT VES (Armovis® EHS) into a 30% by weight CaCl$_2$ brine. The viscosity of the fluid from room temperature to 350° F. was measured at a shear rate of 100 s$^{-1}$ with a Fann50-type viscometer, and plotted in FIG. 3. In another sample, a hydrophobically modified polyacrylamide (SP 292, anionic-polyacrylamide-based terpolymer with the hydrophobic monomer content less than 1.5 mol %, by SNF Floerger, in powder form) was mixed into the baseline fluid at a loading of 0.5% by weight. The viscosity was similarly measured from room temperature to 350° F., and plotted in FIG. 3 as well. Averaged between approximately 250° F. and approximately 350° F., the viscosity was enhanced by approximately 17% with the addition of 0.5% the hydrophobically modified polyacrylamide.

Example 4

Figure 4:
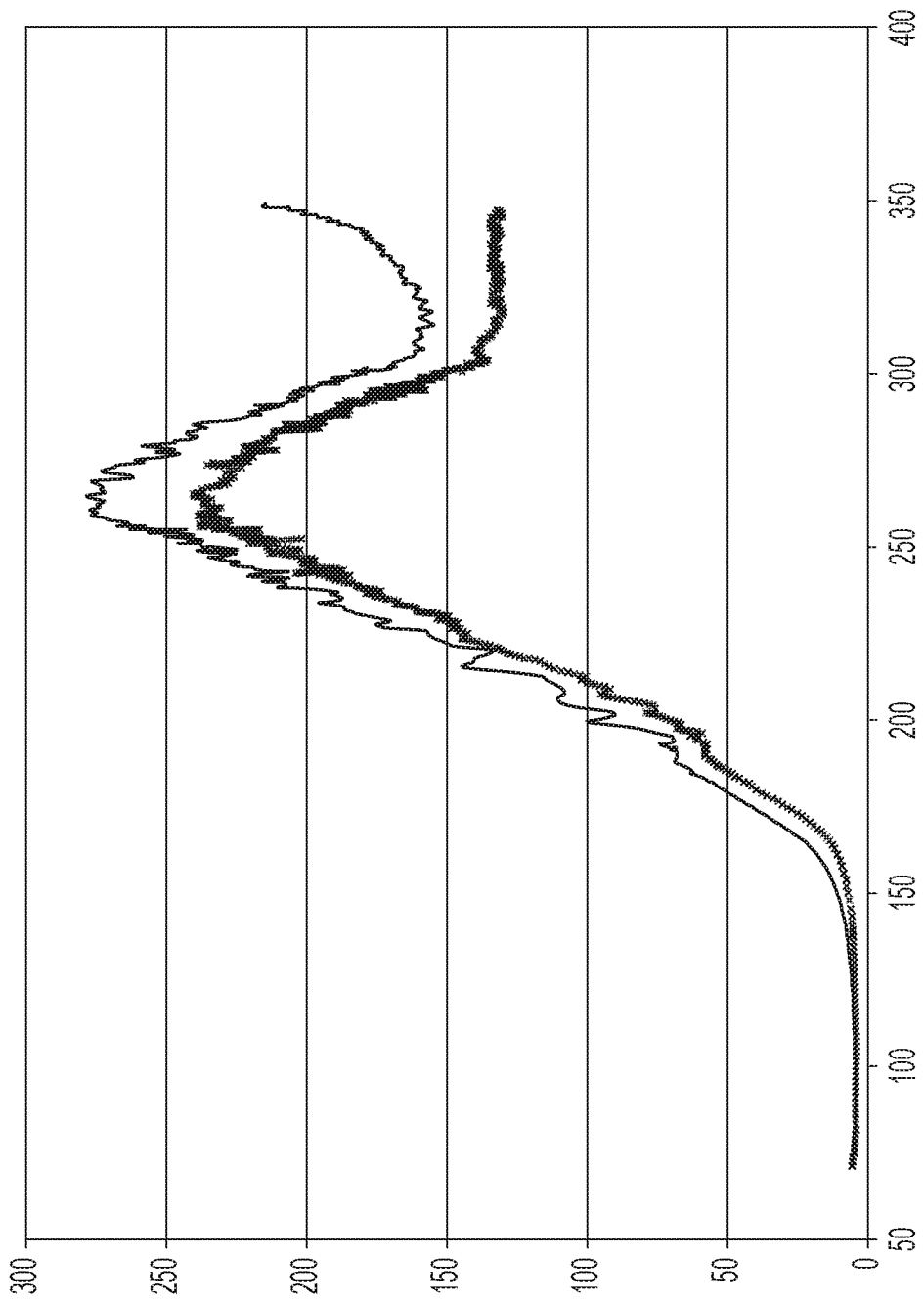

In this example, the baseline viscoelastic fluid was prepared by adding 5% by weight HT VES (Armovis® EHS) into a 30% by weight CaCl$_2$ brine. The viscosity of the fluid from room temperature to 350° F. was measured at a shear rate of 100 s$^{-1}$ with a Fann50-type viscometer, and plotted in FIG. 4. In second sample, a hydrophobically modified polyacrylamide (FP9515SH, anionic-polyacrylamide-based terpolymer with the hydrophobic monomer content less than 1.5 mol %, containing 10-25 mol % of sulfonic monomer, by SNF Floerger, in powder form) was mixed into the baseline fluid at a loading of 0.5% by weight. The viscosity was similarly measured from room temperature to 350° F., and plotted in FIG. 4 as well. Averaged between approximately 250° F. and approximately 350° F., the viscosity was enhanced by approximately 22% with the addition of 0.5% the hydrophobically modified polyacrylamide.

Example 5

In this example, the baseline viscoelastic fluid was prepared by adding 5% by volume HT VES (Armovis EHS) into a 30% by weight CaCl$_2$ brine. More specifically, 40.7 ml tap water, 26.8 g CaCl$_2$.2H$_2$O, and 2.6 ml HT VES was mixed together to form the baseline fluid. The viscosity of the fluid from room temperature to 350° F. was measured at a shear rate of 100 s$^{-1}$ with a Fann50-type viscometer, and plotted in FIG. 5. In another test, polyvinyl alcohol (PVA) (by Aldrich, CAS: 9002-89-5, average molecular weight from 146,000 to 186,000, and 87-89% hydrolyzed) was mixed into the baseline fluid at a loading of 0.5% by weight. The viscosity was similarly measured from approximately 70° F. to 350° F., and plotted.

Figure 5:
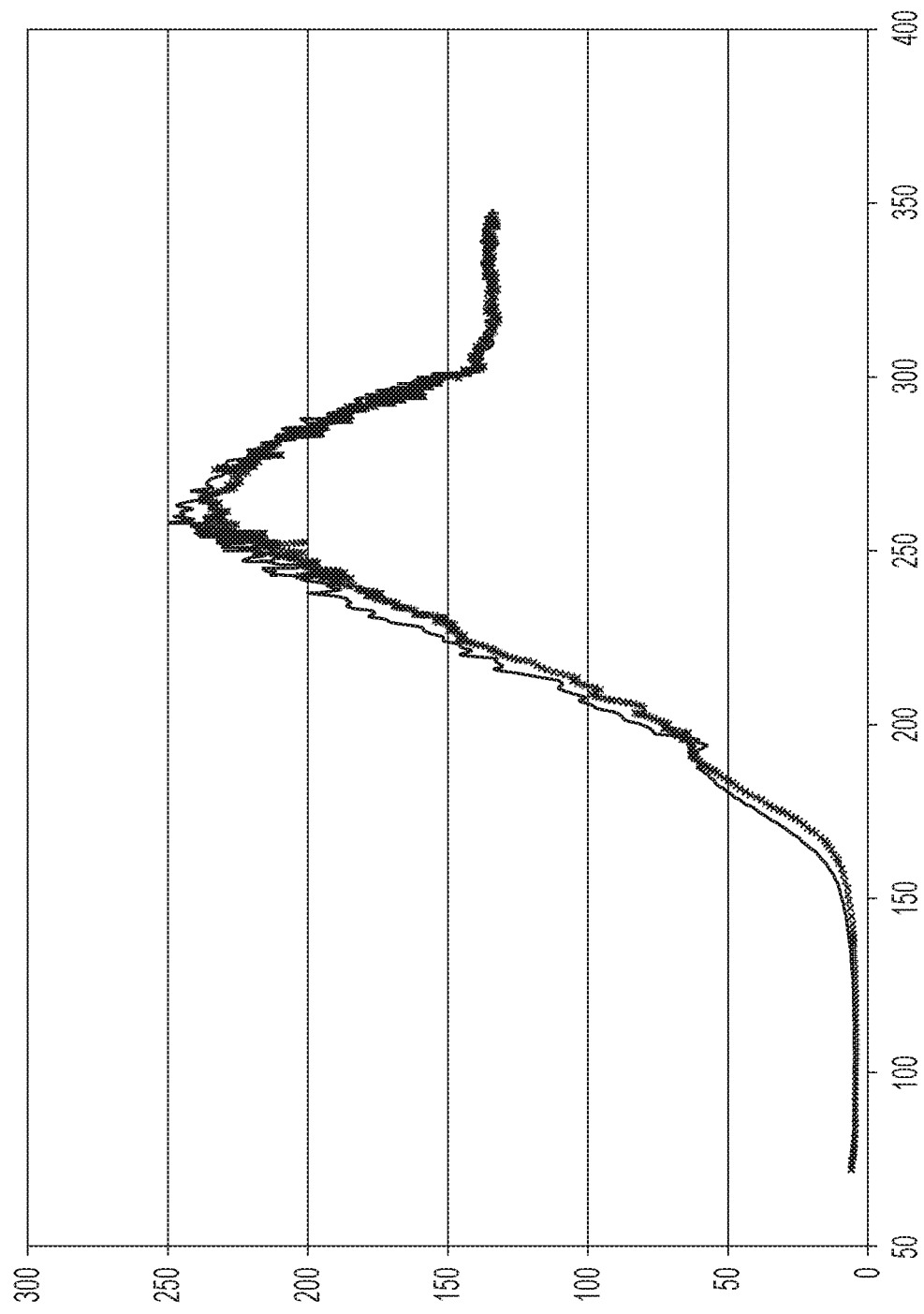

In FIG. 5, the addition of polyvinyl alcohol) (PVA) to a viscoelastic fluid shows no appreciable increase in viscosity. The curves of the viscoelastic fluid baseline containing 5% HT VES denoted by the thickest line (due to backslashes) and the curve representing the combination of PVA polymer and viscoelastic fluid baseline (solid line) nearly overlap with each other, suggesting that the PVA polymer did not enhance the HT VES. This demonstrated that viscosifying performance of the selected polyacrylamide polymers was unique compared to other polymers.

It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A viscoelastic fluid for a subterranean formation comprising:
    viscoelastic surfactant according to formula (I):

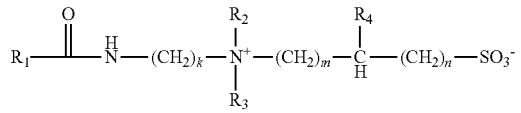

where R$_1$ is a saturated or unsaturated hydrocarbon group of from 17 to 29 carbon atoms, R$_2$ and R$_3$ are each independently selected from a straight chain or branched alkyl or hydroxyalkyl group of from 1 to 6 carbon atoms, R$_4$ is selected from H, hydroxyl, alkyl or hydroxyalkyl groups of from 1 to 4 carbon atoms; k is an integer of from 2-20; m is an integer of from 1-20; and n is an integer of from 0-20;
    brine solution; and
    at least one polyacrylamide viscosity modifier with a weight averaged molecular weight (Mw) from 250,000 g/mol to 40,000,000 g/mol;
    at least 30% by weight of one or more metal salts.

2. The viscoelastic fluid for a subterranean formation according to claim 1, further comprising solvent.

3. The viscoelastic fluid for a subterranean formation according to claim 2, where the solvent is selected from water, alcohol, or combinations thereof.

4. The viscoelastic fluid for a subterranean formation according to claim 3 where the alcohol comprises monohydric alkyloxy, diol, triol, or a combination thereof.

5. The viscoelastic fluid for a subterranean formation according to claim 1, in which the viscoelastic fluid comprises 0.5% to 20% by volume, or 2% to 8% by volume, or 3% to 6% by volume of viscoelastic surfactant.

6. The viscoelastic fluid for a subterranean formation according to claim 1, in which the viscoelastic fluid comprises about 80% to 99% by weight of brine solution.

7. The viscoelastic fluid for a subterranean formation according to claim 1, in which the metal salts are metal halides that comprise calcium chloride, calcium bromide, zinc bromide, or combinations thereof.

8. The viscoelastic fluid for a subterranean formation according to claim 1, in which the metal salts comprise one or more alkali or alkaline earth metal halides.

9. The viscoelastic fluid for a subterranean formation according to claim 1, in which the polyacrylamide comprises nonionic polyacrylamides, acrylamide copolymers, polyacrylamide-based terpolymers, polyacrylamide-based tetra-polymers, modified polyacrylamides, or combinations thereof.

10. The viscoelastic fluid for a subterranean formation according to claim 1, in which the polyacrylamide viscosity modifier has an Mw from 2,000,000 g/mol to 8,000,000 g/mol.

11. The viscoelastic fluid for a subterranean formation according to claim 1 further comprising at least one additional additive.

12. The viscoelastic fluid for a subterranean formation according to claim 11, in which the additional additive comprises one or more polyelectrolytes selected from a list consisting of: polycations, polyanions, zwitterionic polymers, zwitterionic polyacrylamides, and zwitterionic copolymers.

13. The viscoelastic fluid for a subterranean formation according to claim 1 further comprising breaker material.

14. The viscoelastic fluid for a subterranean formation according to claim 1, further comprising an additional surfactant, where the additional surfactant comprises cationic surfactant, anionic surfactant, non-ion surfactant, zwitterionic surfactant or a combination thereof.

15. A viscoelastic fluid for a subterranean formation comprising:
viscoelastic surfactant according to formula (I):

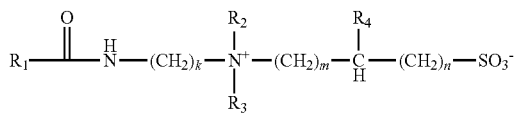

where $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms; k is an integer of from 2-20; m is an integer of from 1-20; and n is an integer of from 0-20;
brine solution;
at least one polyacrylamide viscosity modifier with a weight averaged molecular weight (Mw) from 250,000 g/mol to 40,000,000 g/mol; and
at least 30% by weight of one or more metal salts;
wherein the polyacrylamide viscosity modifier has a hydrolysis level of less than 1 mol %.

16. The viscoelastic fluid for a subterranean formation according to claim 15, where the polyacrylamide viscosity modifier comprises a nonionic polyacrylamide.

17. The viscoelastic fluid for a subterranean formation according to claim 15, further comprising solvent.

18. The viscoelastic fluid for a subterranean formation according to claim 17, where the solvent is selected from water, alcohol, or combinations thereof.

19. The viscoelastic fluid for a subterranean formation according to claim 15, in which the viscoelastic fluid comprises 0.5% to 20% by volume, or 2% to 8% by volume, or 3% to 6% by volume of viscoelastic surfactant.

20. The viscoelastic fluid for a subterranean formation according to claim 15, in which the metal salts are metal halides that comprise calcium chloride, calcium bromide, zinc bromide, or combinations thereof.

21. The viscoelastic fluid for a subterranean formation according to claim 15, in which the brine solution comprises one or more alkali or alkaline earth metal halides.

22. The viscoelastic fluid for a subterranean formation according to claim 15, in which the polyacrylamide comprises nonionic polyacrylamides, acrylamide copolymers, polyacrylamide-based terpolymers, polyacrylamide-based tetra-polymers, modified polyacrylamides, or combinations thereof.

23. The viscoelastic fluid for a subterranean formation according to claim 15, in which the polyacrylamide viscosity modifier has an Mw from 2,000,000 g/mol to 8,000,000 g/mol.

24. The viscoelastic fluid for a subterranean formation according to claim 15, further comprising an additional surfactant, where the additional surfactant comprises cationic surfactant, anionic surfactant, non-ion surfactant, zwitterionic surfactant or a combination thereof.

* * * * *

UNITED STATES PATENT AND TRADEMARK OFFICE
CERTIFICATE OF CORRECTION

PATENT NO. : 10,047,279 B2
APPLICATION NO. : 15/581408
DATED : August 14, 2018
INVENTOR(S) : Leiming Li et al.

It is certified that error appears in the above-identified patent and that said Letters Patent is hereby corrected as shown below:

In the Claims

Column 10, Line 17:
"1. A viscoelastic fluid for a subterranean formation comprising:
viscoelastic surfactant according to formula (I):

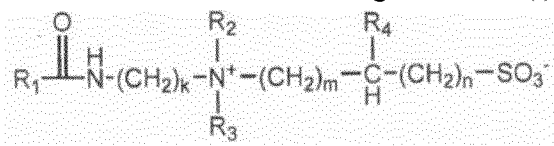

where $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms, $R_4$ is selected from H, hydroxyl, alkyl or hydroxyalkyl groups of from 1 to 4 carbon atoms; k is an integer of from 2-20; m is an integer of from 1-20; and n is an integer of from 0-20;
brine solution; and
at least one polyacrylamide viscosity modifier with a weight averaged molecular weight (Mw) from 250,000 g/mol to 40,000,000 g/mol;
at least 30% by weight of one or more metal salts."

Should read:
--1. A viscoelastic fluid for a subterranean formation comprising:
viscoelastic surfactant according to formula (I):

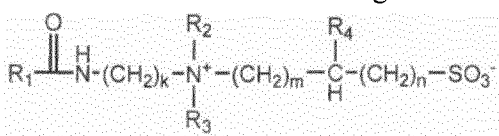

where $R_1$ is a saturated or unsaturated hydrocarbon group of from 17 to 29 carbon atoms, $R_2$ and $R_3$ are each independently selected from a straight chain or branched alkyl or hydroxyalkyl group of from 1 to 6 carbon atoms, $R_4$ is selected from H, hydroxyl, alkyl or hydroxyalkyl groups of from 1

Signed and Sealed this
Eleventh Day of December, 2018

Andrei Iancu
*Director of the United States Patent and Trademark Office* to 4 carbon atoms; k is an integer of from 2-20; m is an integer of 1-20; and n is an integer of from 0-20;

brine solution;

at least one polyacrylamide viscosity modifier with a weight averaged molecular weight (Mw) from 250,000 g/mol to 40,000,000 g/mol; and at least 30% by weight of one or more metal salts.--